(12) United States Patent
Dafni et al.

(10) Patent No.: US 8,964,942 B2
(45) Date of Patent: Feb. 24, 2015

(54) IMAGING SYSTEM USING MULTISOURCE COLLIMATION AND A METHOD ASSEMBLY AND SYSTEM FOR PROVIDING MULTISOURCE COLLIMATION

(75) Inventors: Ehud Dafni, Caesarea (IL); David Ruimi, Ganot Hadar (IL)

(73) Assignee: Arineta Ltd., Caesarea (IL)

( * ) Notice: Subject to any disclaimer, the term of this patent is extended or adjusted under 35 U.S.C. 154(b) by 691 days.

(21) Appl. No.: 12/921,181

(22) PCT Filed: Mar. 12, 2009

(86) PCT No.: PCT/IL2009/000280
§ 371 (c)(1),
(2), (4) Date: Sep. 7, 2010

(87) PCT Pub. No.: WO2009/118723
PCT Pub. Date: Oct. 1, 2009

(65) Prior Publication Data
US 2011/0007878 A1 Jan. 13, 2011

Related U.S. Application Data

(60) Provisional application No. 61/070,962, filed on Mar. 27, 2008.

(51) Int. Cl.
*G21K 1/04* (2006.01)
*A61B 6/03* (2006.01)
*G01T 1/29* (2006.01)

(52) U.S. Cl.
CPC .................................. *G01T 1/2985* (2013.01)
USPC ................................. 378/150; 378/9; 378/16

(58) Field of Classification Search
USPC ................ 378/149, 150, 9, 16, 148, 151, 152
See application file for complete search history.

(56) References Cited

U.S. PATENT DOCUMENTS

| | | | | |
|---|---|---|---|---|
| 3,924,136 A * | 12/1975 | Heynick et al. | ............ | 250/492.2 |
| 4,150,293 A * | 4/1979 | Franke | ............... | 378/9 |
| 5,335,255 A * | 8/1994 | Seppi et al. | ................ | 378/4 |
| 5,608,776 A * | 3/1997 | Hsieh | ............... | 378/147 |
| 6,078,772 A * | 6/2000 | Takaya et al. | ............... | 399/297 |
| 6,125,167 A * | 9/2000 | Morgan | ............... | 378/124 |
| 7,869,561 B2 * | 1/2011 | Dafni | ............... | 378/9 |
| 8,693,638 B2 * | 4/2014 | Dafni | ............... | 378/9 |
| 2007/0110211 A1 * | 5/2007 | Hsieh et al. | ............... | 378/16 |

* cited by examiner

*Primary Examiner* — Glen Kao

(74) *Attorney, Agent, or Firm* — Vladimir Sherman; Professional Patent Solutions

(57) ABSTRACT

Disclosed is a collimator assembly for a multi-radiation-source medical imaging system (e.g. CT) and a medical imaging system utilizing the collimator. According to some embodiments of the present invention, there is provided a collimator assembly including at least two apertures, which apertures are adjustable substantially synchronously by one or more actuators.

18 Claims, 9 Drawing Sheets

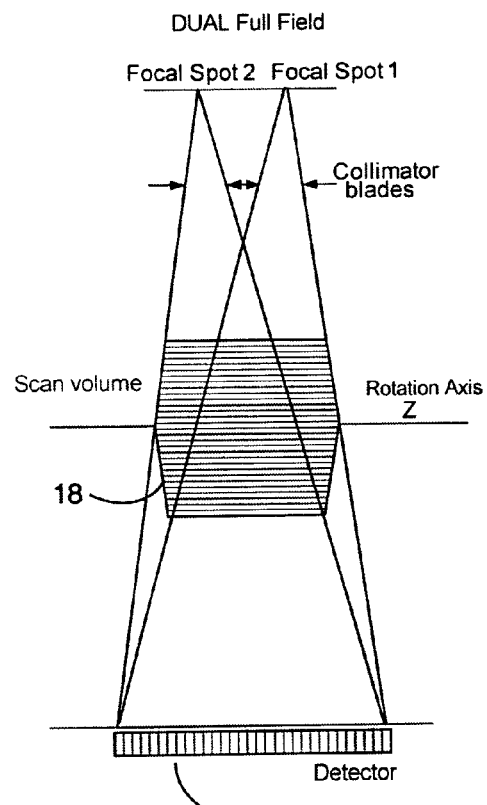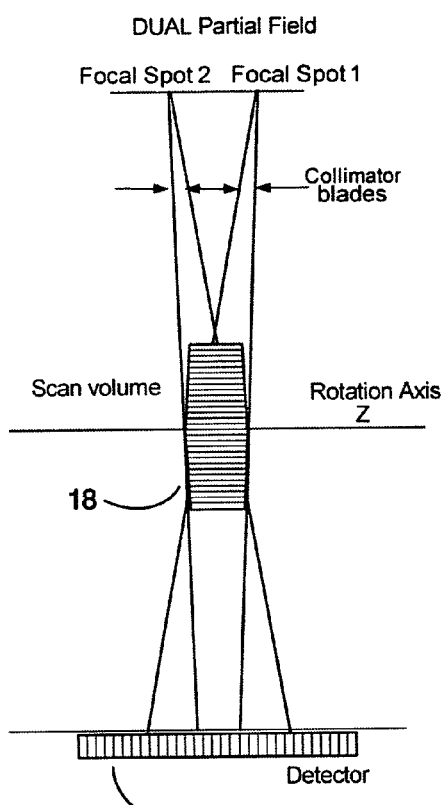
FIG.7A  FIG.7B
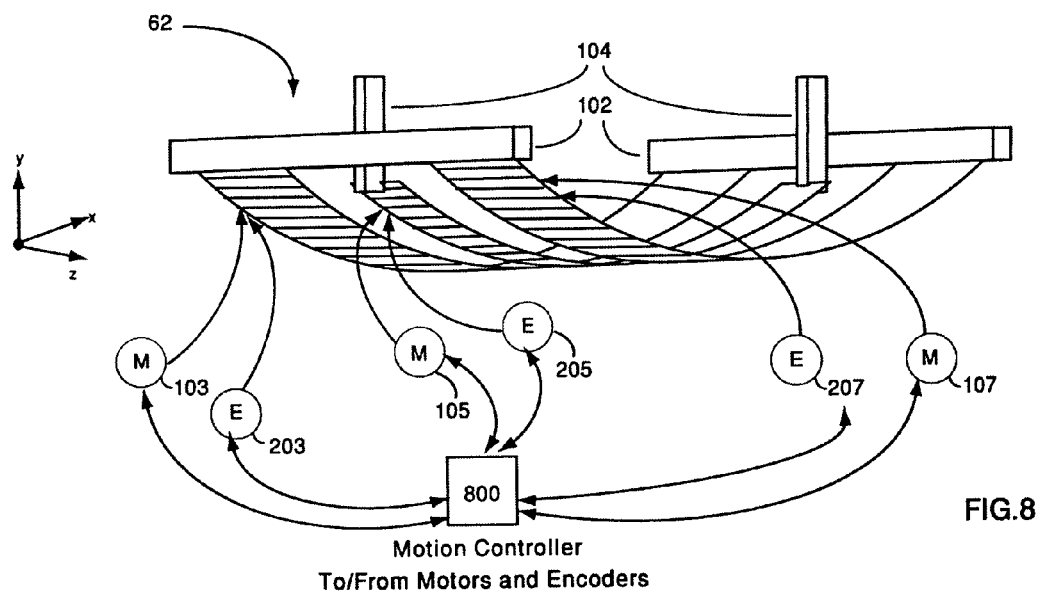
FIG.8

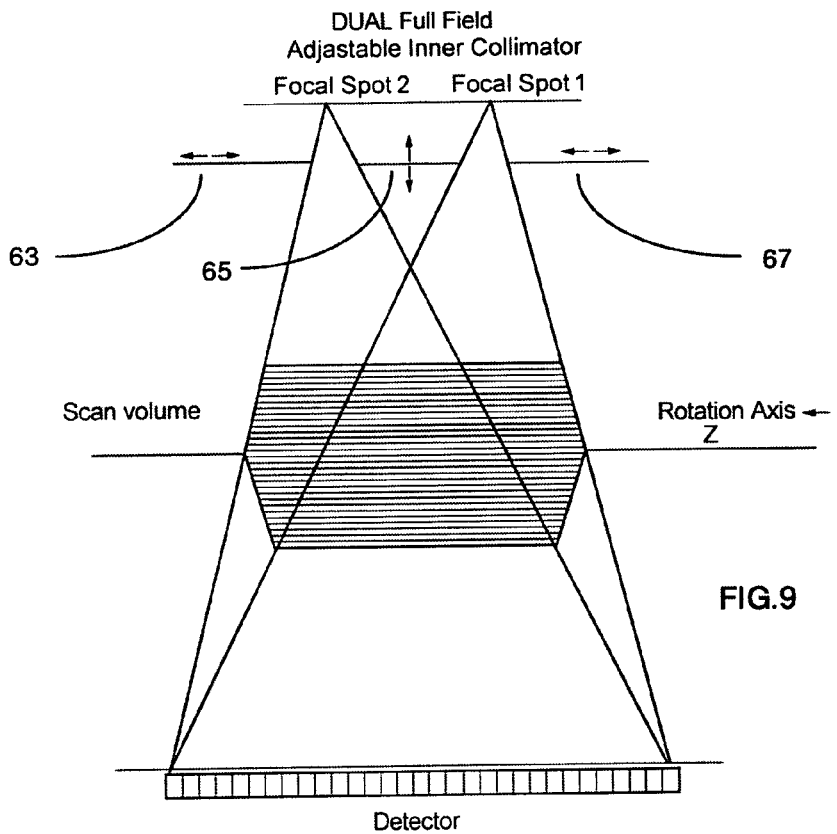
FIG. 9
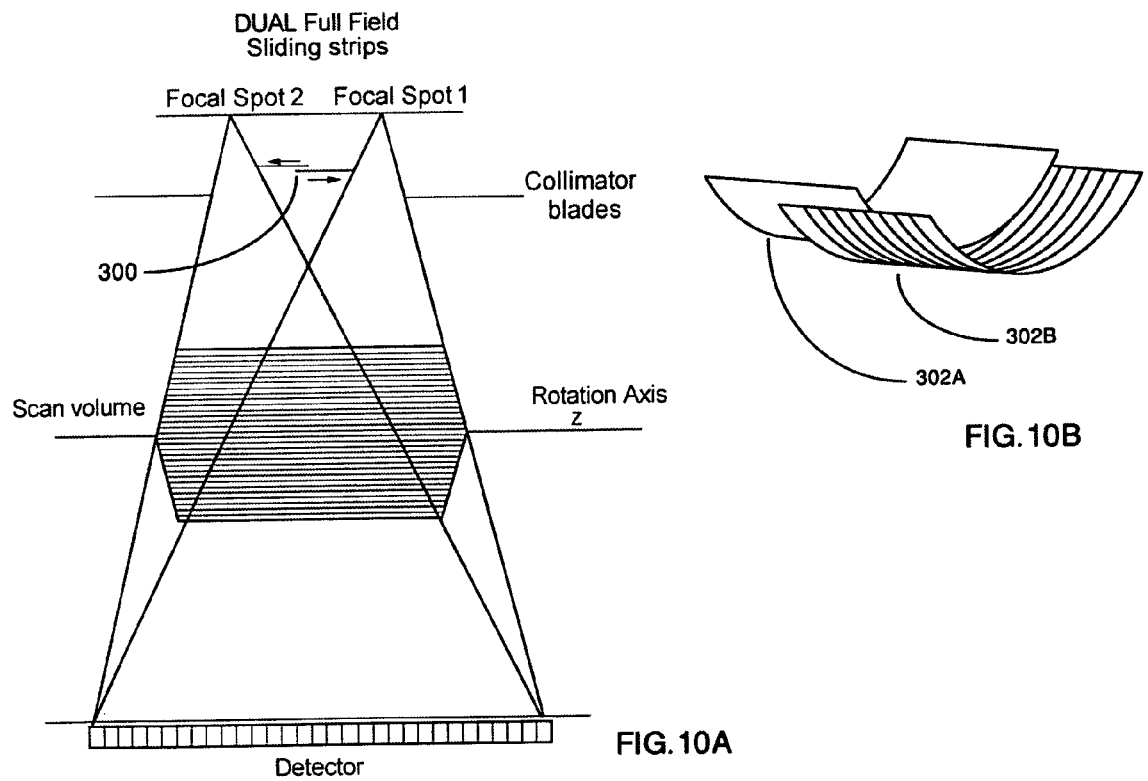
FIG. 10A
FIG. 10B

IMAGING SYSTEM USING MULTISOURCE COLLIMATION AND A METHOD ASSEMBLY AND SYSTEM FOR PROVIDING MULTISOURCE COLLIMATION

FIELD OF THE INVENTION

The present invention generally relates to the fields of illumination and imaging. More specifically, the present invention relates to an imaging system using multisource collimation and a method, assembly and systems for providing multisource collimation of radiation in the imaging systems.

BACKGROUND

The principle of illuminating an object to acquire images dates back over one hundred years. Imaging is a general term used for a variety of techniques, technologies and fields associated with the acquisition of two dimensional and three dimensional representations of an object or subject. Many imaging techniques used to acquire analog or digital representations of the surface of an object require illumination. Most imaging techniques used to acquire analog or digital representations of planes of structures inside an object require illumination by a beam capable of penetrating the object and being either transmitted or reflected from the object. For example, in X ray transmission imaging a beam of X rays is transmitted through an object and an image is generated based on X ray attenuation data.

Medical imaging refers to the techniques and processes used to create images of the human body (or parts thereof) for clinical purposes (medical procedures seeking to reveal, diagnose or examine disease) or medical science (including the study of normal anatomy and physiology).

One example of a medical imaging technology is Computed Tomography ("CT"). The basic principle behind CT scanning includes characterizing each of a set of volume elements in a volume being scanned by transmitting radiation through each of the volume elements from multiple angles. Each exposure at each angle of a CT scan produces a one or two dimensional image on a sensor, where the intensity of exposure on a sensor element of the sensor array indicates an average attenuation of a ray of transmitted caused by matter within the scanned volume along a direct path between the radiation source and the sensor element. Estimation of density or other attenuation characteristics of individual volume elements may be achieved using a back projection process on a set of collected attenuation data. A variety of image filtering and 3D rendering techniques may be used to convert the collected attenuation data into a 3D representation of the internal structures of a scanned object.

Early generation CT scanners had a one dimensional detector array and were capable of scanning one axial slice of the subject at a time. More recent CT scanners have a two dimensional detector array comprising multiple rows of detector elements. These scanners, usually referred to as multislice or multidetector CT scanners, are capable of scanning multiple substantially parallel slices of the subject simultaneously. Further, CT scanners with a large number of detector rows are typically referred to as cone beam scanners. Cone beam scanners image a whole volume at a time.

Some CT scanners use a "step and shoot" protocol. In this protocol the gantry rotates about a stationary subject to generate a single or multiple images of the scanned subject, the subject is translated relative to the gantry, the gantry rotates again to generate images of an adjacent region, etc. Other CT scanners use a helical or spiral mode wherein the subject is being translated relative to the gantry while the gantry rotates and attenuation data is acquired.

Turning now to the attached figures:

FIG. 1 shows the geometry of a prior art single source cone beam CT scanner 9. X ray source 10 emits a beam of X radiation 12 in the direction of detector array 14. Typically the source-detector pair is mounted on a rotating gantry and a subject to be examined 18 is positioned between the source and the detector. Detector array 14 may be composed of an array of discrete elements arranged in rows and columns, a flat panel detector or the like. The array may have a spherical or arc shape centered about the focal spot (as shown), be planar or have other surface curvature. Herein below we refer to "rows" of the detector as the X direction of the detector perpendicular to the rotation axis (Z direction).

In many single source CT scanners, an X ray source and arc shaped array detector are both mounted on a gantry and made to rotate about a subject to be scanned. The beam is shaped by a collimator 16 positioned between the X ray source and the subject. The collimator is designed so as to confine X ray beam projection onto the detector area (or smaller area), thereby limiting radiation going through the subject to only radiation useable for image reconstruction. Collimators typically include blades movable in a direction parallel to the rotation axis (Z axis) to increase or reduce the volume scanned in one rotation as needed.

CT scanners using multiple cone beam sources are also known in the art. Beam geometry of a CT scanner arrangement that employs multiple sources distributed along an axis parallel to the rotation axis (Z axis), such that the multiple sources irradiate a common detector array, is shown in FIGS. 4a and 4b and disclosed in application US 2006/285633 A1 to Sukovic et. al., WO 2006/038145 A to Koken at. al. and WO 2008/122971 to Dafni et. al—incorporated herein by reference. However, CT scanners of such design are not yet available commercially and are not known to have yet been actually built. One of the complexities associated with CT scanners including multiple beam sources is proper collimation.

Today, adjustable synchronized collimation of multiple beams is problematic and requires multiple highly matched collimators driven by either the same or highly synchronized control signals. There is a need in the fields of illumination and imaging for methods, apparatus and systems for providing adjustable collimation of beams produced by multiple beam sources.

SUMMARY OF THE INVENTION

The present invention is method, assembly and system for multisource collimation in a medical imaging system, such as a CT system. According to some embodiments of the present invention, there may be provided an imaging radiation source assembly including two or more radiation sources arranged along a common plane and adapted to emit radiation in generally a common direction, the direction of one or more radiation detectors. Between the radiation sources and the detectors, there may be provided a multi-aperture collimator arrangement or assembly located in a path of the emitted radiation. The multi-aperture collimator may be formed by a first and a second beam blocking elements and by an intermediate beam blocking element positioned between the first and the second beam blocking elements. An opening between the first beam blocking element and a first edge of the intermediate beam blocking element may form a first aperture, and an opening between a second edge of the intermediate beam blocking element and the second beam blocking element may form a second aperture.

According to some embodiments of the present invention, there may be provided a first actuator adapted to alter substantially in synchronous dimensions of each of the first and second apertures by moving one or more of the beam blocking elements. The first actuator may be functionally associated with the intermediate beam blocking element and may move the intermediate beam blocking element. According to embodiments where the intermediate beam blocking element is a blade, the actuator may move the blade along an axis perpendicular to the common plane of the radiation sources. According to embodiments of the present invention where the intermediate beam blocking element is a non-circular cylinder having a different radius along different rotational angles, the actuator may be adapted to rotate the non-circular cylinder around an axis. The non-circular cylinder may be a shaft, bar or rod (shaft/bar/rod).

In some embodiments continuous rotation of the non-circular cylinder shaft, bar or rod (shaft/bar/rod), may provide continuous variation of apertures width. In other embodiments the cylinder may have discrete rotational positions corresponding to discrete values of aperture widths. The cross section of the non-circular cylinder intermediate beam blocking element may be oblong, have a generally elliptical shape, have a polygon like shape or have any other shape or shape combination that may enable for the variation of aperture widths. According to further embodiments of the present invention, either the first actuator and/or another actuator may be functionally associated with the first and/or the second beam blocking elements. The one or more actuators may be adapted to move the first and second beam blocking elements substantially synchronously, such that dimensions of the first and second apertures are altered substantially synchronously. According to embodiments where the first and second beam blocking elements are blades, the associated one or more actuators may be adapted to move the blades along and/or around an axis perpendicular to the common plane of the radiation sources. Alternatively, the one or more actuators may be adapted to move the blades along and/or around an axis parallel to the common plane.

According to embodiments of the present invention the first and second beam blocking element may be non-circular cylinders or eccentric-circular cylinders having a different radius along different rotational angles, the one or more associated actuators may be adapted to rotate one or more of the non-circular or eccentric-circular cylinders around their central axes. The cross section of non-circular cylinder used as a first/second beam blocking element may be oblong, have a generally elliptical shape, have a polygon like shape or have any other shape or shape combination that may enable for the variation or modulation of aperture widths.

According to some embodiments of the present invention, some of the blocking elements are composed of metal blades with either straight edges or curved edges. The metal may be composed of heavy metal selected from the group consisting of tungsten, tantalum, lead, and alloys containing tungsten or tantalum or lead. At least one of the beam blocking elements may be eccentric circular elements.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 7A & 7B are ray traces of an exemplary multisource CT system, in accordance with some embodiments of the present invention, wherein FIG. 7A relates to the CT being operated in a mode such that radiation fields from each of the two sources (dual field) fully overlap on the detector and FIG. 7B relates to the CT being operated in a mode such that the dual fields only partially overlap on the detector;

FIG. 8 shows a prospective view of an exemplary CT collimators system, in accordance with some embodiments of the present invention, which prospective includes symbolic representations of actuators (e.g. motors) and position encoders;

FIG. 9 shows a side view with a ray trace of an exemplary dual aperture collimator, in accordance with some embodiments of the present invention, wherein first and second side beam blocking elements are adapted to move sideways relative to an axis of the beam and an intermediate beam blocking element is adapted to move closer and further along the axis of the of beam;

FIG. 10A shows a side view with a ray trace of an exemplary dual aperture collimator, in accordance with some embodiments of the present invention, wherein the intermediate beam blocking element is composed of two overlapping blades adapted to slide towards and away from one another;

FIG. 10B is a prospective view of the exemplary intermediate beam blocking element blades of FIG. 10A, in accordance with some embodiments of the present invention;

Figure 1:
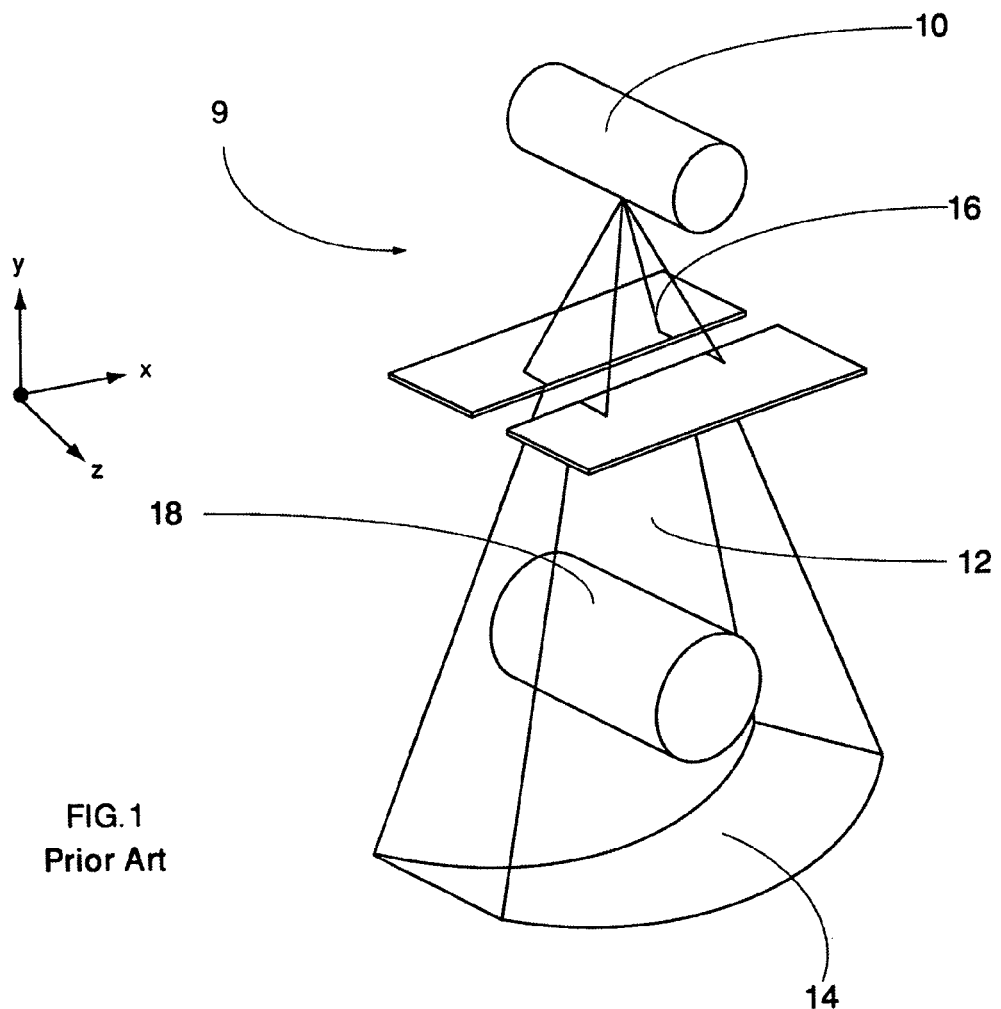
FIG. 1 is a symbolic block diagram showing a radiation pattern achieved using a single source and a single aperture collimator according to CT systems of the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is method, assembly and system for multisource collimation in a medical imaging system, such as a CT system. According to some embodiments of the present invention, there may be provided an imaging radiation source assembly including two or more radiation sources arranged along a common plane and adapted to emit radiation in generally a common direction, the direction of one or more radiation detectors. Between the radiation sources and the detectors, there may be provided a multi-aperture collimator arrangement or assembly located in a path of the emitted radiation. The multi-aperture collimator may be formed by a first and a second beam blocking elements and by an intermediate beam blocking element positioned between the first and the second beam blocking elements. An opening between the first beam blocking element and a first edge of the intermediate beam blocking element may form a first aperture, and an opening between a second edge of the intermediate beam blocking element and the second beam blocking element may form a second aperture.

According to some embodiments of the present invention, there may be provided a first actuator adapted to alter substantially in synchronous dimensions of each of the first and second apertures by moving one or more of the beam blocking elements. The first actuator may be functionally associated with the intermediate beam blocking element and may move the intermediate beam blocking element. According to embodiments where the intermediate beam blocking element is a blade, the actuator may move the blade along an axis perpendicular to the common plane of the radiation sources. According to embodiments of the present invention where the intermediate beam blocking element is a non-circular cylinder having a different radius along different rotational angles, the actuator may be adapted to rotate the non-circular cylinder around an axis. In some embodiments continuous rotation of the cylinder may provide continuous variation of apertures width. In other embodiments the cylinder may have discrete rotational positions corresponding to discrete values of aperture widths. The cross section of the non-circular cylinder intermediate beam blocking element may be oblong, have a generally elliptical shape, have a polygon like shape or have any other shape or shape combination that may enable for the variation of aperture widths. According to further embodiments of the present invention, either the first actuator and/or another actuator may be functionally associated with the first and/or the second beam blocking elements. The one or more actuators may be adapted to move the first and second beam blocking elements substantially synchronously, such that dimensions of the first and second apertures are altered substantially synchronously. According to embodiments where the first and second beam blocking elements are blades, the associated one or more actuators may be adapted to move the blades along and/or around an axis perpendicular to the common plane of the radiation sources. Alternatively, the one or more actuators may be adapted to move the blades along and/or around an axis parallel to the common plane.

According to embodiments of the present invention the first and second beam blocking element may be non-circular cylinders or eccentric-circular cylinders having a different radius along different rotational angles, the one or more associated actuators may be adapted to rotate one or more of the non-circular or eccentric-circular cylinders around their central axes. The cross section of non-circular cylinder used as a first/second beam blocking element may be oblong, have a generally elliptical shape, have a polygon like shape or have any other shape or shape combination that may enable for the variation of aperture widths.

FIG. 1 shows a prior art cone beam CT scanner 9. X ray source 10 emits a beam of X radiation 12 in the direction of detector array 14. Typically the source-detector pair is mounted on a rotating gantry and a subject to be examined 18 is positioned between the source and the detector. Detector array 14 may be composed of an array of discrete elements arranged in rows and columns, a flat panel detector or the like. It may have a spherical or arc shape centered about the focal spot (as shown), be planar or have other surface curvature. Herein below we refer to "rows" of the detector as the X direction of the detector perpendicular to the rotation axis (Z direction).

The cone of radiation emitted from source 10 is collimated in the Z axis direction by collimator 16. Collimator 16 typically limits the beam opening to the range covered by detector 14. Collimator 16 is typically adjustable in the direction of the rotation axis (Z axis) so smaller beam opening can be obtained if thinner slices or a smaller length of the subject needs to be examined. Typically there are also collimators or beam limiters in the X direction (not shown).

Various parts of CT scanner 9, including the gantry, patient support, data acquisition system, controller, display unit and other parts are not shown in FIG. 1 for clarity.

Figure 2:
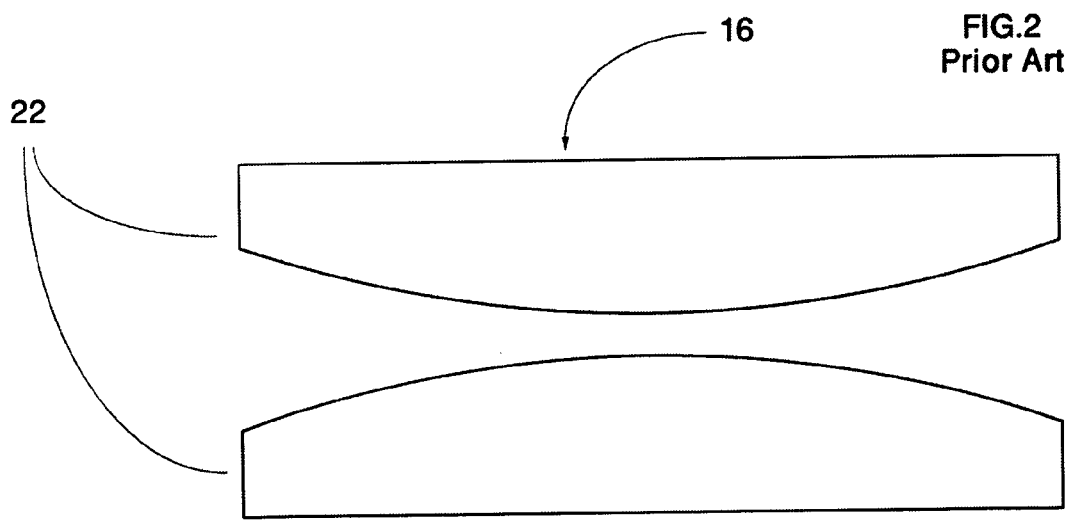
FIG. 2 is a top view of a single aperture planner CT collimator according to the prior art.

FIG. 2 is a schematic top view of a prior art planar collimator 16 adapted for use in system 9 with an arc detector 14. Collimator 16 has two blades 22. The projection of planar blades 22 on arc detector 14 is not strictly parallel to the array rows. Blades 22 are shown to have each a curved edge, such that the collimator projects beam edges parallel to the detector 14 rows. This feature is useful to improve radiation utilization and simplify reconstruction software.

By "blade" we refer hereinbelow to a member of the collimator including typically a support frame and a part made of heavy metal such as lead, tantalum, tungsten and the like or compounds including such metals. The blade has at least one well define edge used to cut the beam. Typically the blade includes a sheet of heavy metal such as tantalum or tungsten at a thickness in a typical range of 1 mm to 2 mm. However, other designs are also possible.

The solution disclosed in FIG. 2 is satisfactory for a fixed geometry cone beam CT with a fixed array of planar blades 22 with curved edges. However, if the blades 22 are movable in the Z direction, at each position they need a different radius of curvature for the edge, which makes the solution impractical.

Figure 3:
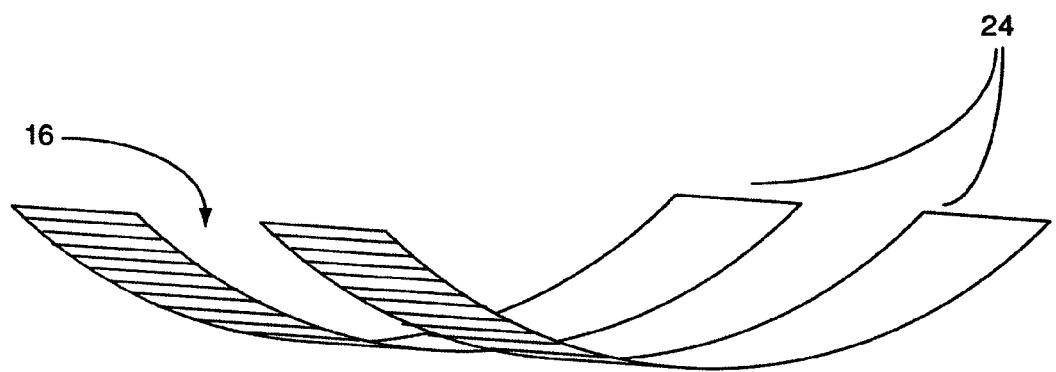
FIG. 3 is a prospective view of a single aperture CT collimator with arced blades adapted for use with a curved CT detector according to the prior art.

FIG. 3 shows an alternative geometry of prior art collimator 16 using arc shaped collimator blades 24 which generate straight projections parallel to the rows on the detector 14. Both the collimator blades and detector arcs are typically centered about the focal spot.

Figure 4A:
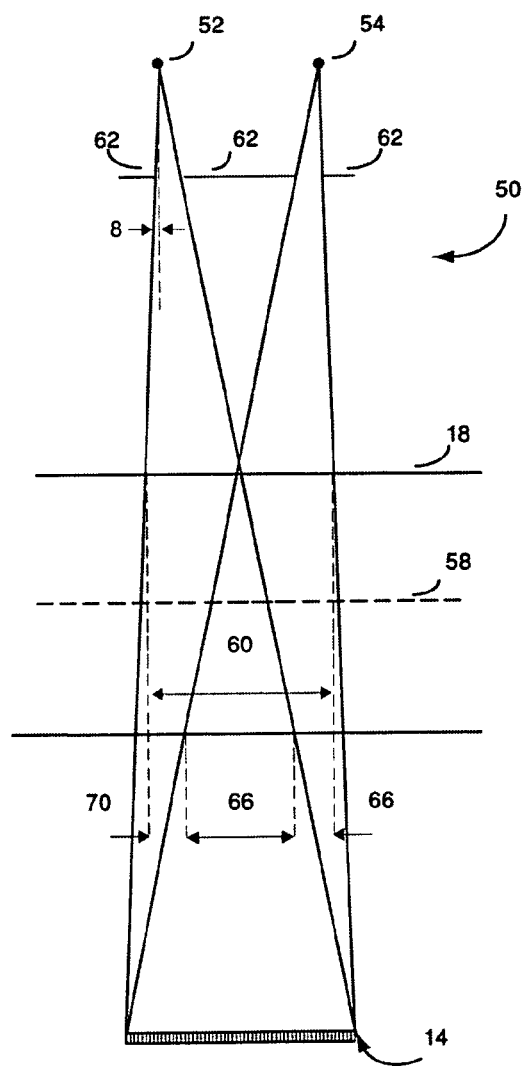
FIGS. 4A and 4B depicts ray traces of exemplary multisource CT systems, in accordance with some embodiments of the present invention, wherein FIG. 4A relates to an exemplary dual radiation source system with a dual aperture collimator and FIG. 4B relates to an exemplary triple radiation source system with a three aperture collimator.
Figure 4B:
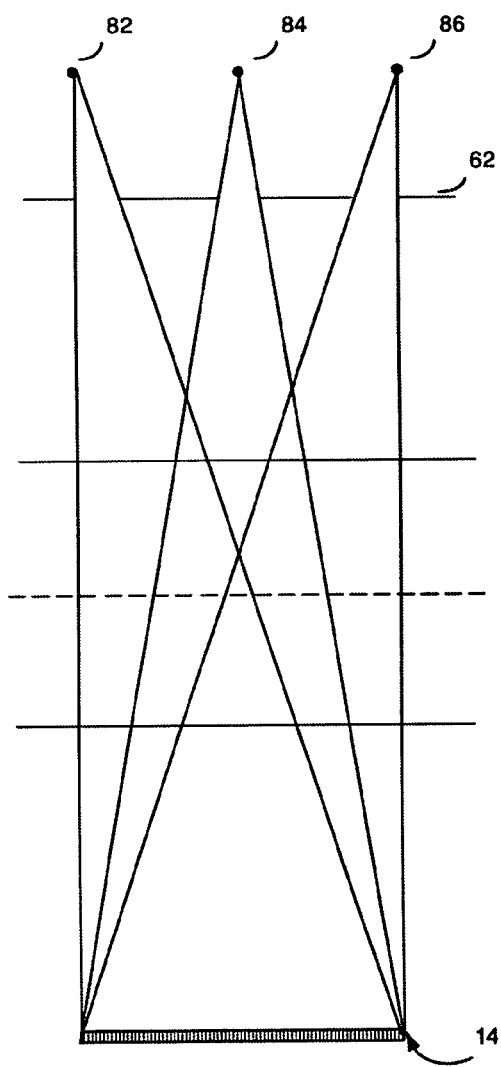

FIG. 4a is a side view of a multiple cone beam sources scanner 50, in accordance with some embodiments of the present invention, wherein two sources 52, 54 arranged along an axis parallel to the axis of rotation 58 (Z axis). The cone beams may be collimated by collimator 62 so they traverse examination zone 18 and impinge onto detector array 14. FIG. 4b is a similar arrangement with three beam sources 82, 84, 86.

Figure 5:
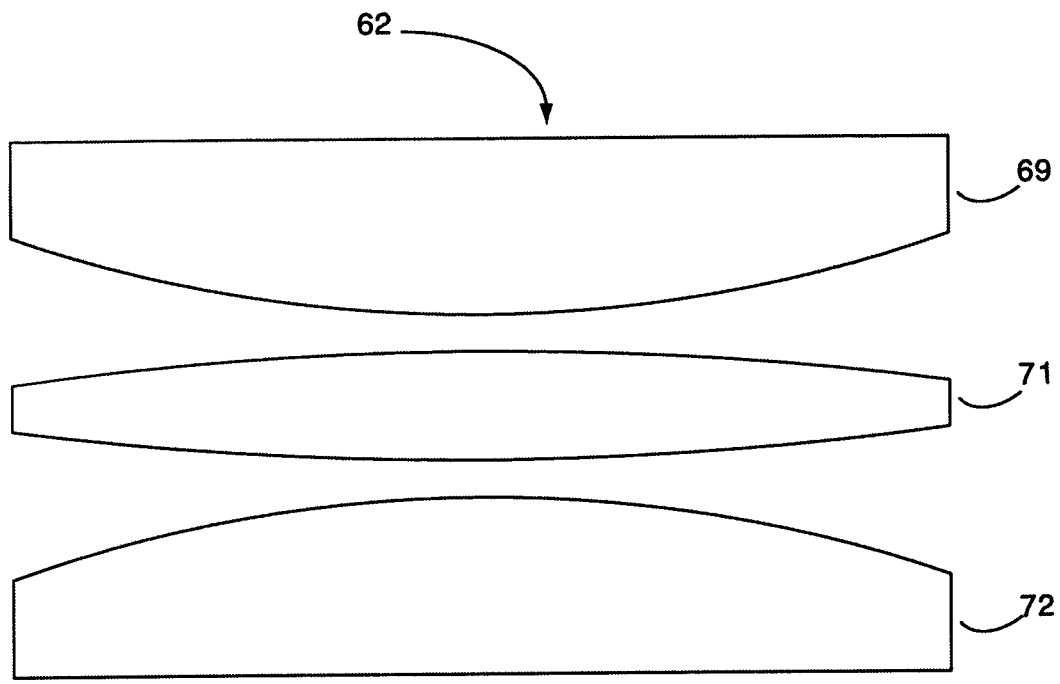
FIG. 5 is a top view of an exemplary dual aperture collimator usable with a dual radiation source CT system, in accordance with some embodiments of the present invention.
Figure 6:
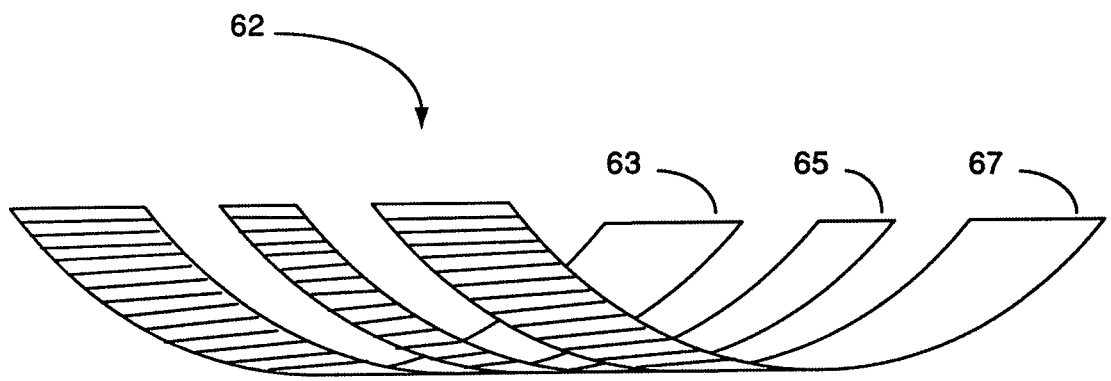
FIG. 6 is a prospective view of an exemplary dual aperture collimator adapted for use with a dual radiation sources CT having a curved radiation detector, in accordance with some embodiments of the present invention.

FIG. 5 is a top view of a collimator 62 for a fixed geometry multiple cone beam CT with arc detector, in accordance with some embodiments of the present invention. Fixed array of planar blades 69, 71, 73 with curved edges may provide beams projections parallel to the detector array rows. Alternatively, curved collimator blades 63, 65, 67 may be provided as shown in FIG. 6. In this design, blades 63, 65, 67 may be curved in such a way that the projection of the collimated beam on detector 14 is parallel to the detector's rows.

Collimators as shown in FIG. 5 and FIG. 6 may be suitable for a CT scanner with two cone beam sources operated at fixed beams openings. Similar designs may be provided for larger number of cone beams by using additional inner members of the collimator where the number of inner members of the collimator is the number of sources minus one.

FIG. 7a and FIG. 7b show two beam geometries of the same CT scanner which has two cone beam sources, with the collimators adjusted for different settings for the two geometries, in accordance with some embodiments of the present invention. FIG. 7a shows maximum coverage of the examined subject 18. FIG. 7b shows a situation where smaller coverage is required in the Z direction. Using the collimator setting as in FIG. 7b may be useful to reduce the radiation dose received by the examined subject and reduce the amount of scattered radiation received by detector 14. Fixed dimension embodiments of the collimators designs disclosed hereinabove may not be suitable for the CT scanner shown in FIG. 7a and FIG. 7b as they may not allow adjustment of the coverage by the two beams.

FIG. 8 illustrates a collimator, in accordance with some embodiments of the present invention. Collimator 62 may be used in a system such as the systems shown in FIG. 7a and FIG. 7b. Collimator 62 has two outer blades 63 and 67 and one inner blade 65. Outer blades 63, 67 may be mounted on parallel linear rails 102 such that each blade can move in the direction parallel to the axis of rotation (Z direction). Further, blades 63 and 67 may be connected to drive motors 103 and 107 and to position encoders 203 and 207, respectively. Inner blade 65 may be mounted on parallel linear rails 104 such that the blade can move in the direction perpendicular to the common plane of the radiation sources. (Y direction). Further, blade 65 may be connected to drive motor 105 and to position encoder 205, respectively. Drive motors 103, 105 and 107 and encoders 203, 205 and 207 may be connected to the motion controller 800 that may be adapted to position the blades in desired positions within their range of motion.

A person experienced in the art will appreciate that this design for positioning the blades is provided by a way of example and other designs allowing variable positioning of the blades are possible as well. Further, the controller may be adapted for dynamic adjustment of the collimator blades position, for example in response to drift in source position relative to the examination zone and/or the detector. Further, the design may be modified as to allow also for lateral adjustment (in the Z direction) of the inner blade position so as to increase one beam's coverage and reduce the other beam's coverage.

FIG. 9 shows a CT scanner, in accordance with some embodiments of the present invention, wherein a collimator such as disclosed in FIG. 8 may be used to modify beam geometry. Outer blades 63 and 67 may be moved in the Z direction to pre-determined positions as required for a desired coverage of the scanner. Inner blade 65 may move in the Y direction to pre-defined position. Inner blade 65 position further from the sources may decrease the coverage of the cone beams. Inner blade 65 position closer to the sources may increase the coverage of each of the cone beams and may also increase the overlap between the beams. Optional lateral (Z direction) movement of the inner blade of the collimator may change the balance between the two cone beams. Blades 63, 65, 67 in FIG. 8 are typically of arc shape. At different inner blade 65 positions slightly different arc curvature may be needed. This minor effect may be neglected and arc curvature corresponding to position in the middle of the range or to one end of the range or to another value may be applied.

FIGS. 10a and 10b illustrate a CT scanner and a corresponding inner blade, respectively, in accordance with further exemplary embodiment of the present invention. In this exemplary embodiment, shown in FIGS. 10a and 10b, a variable width of inner blade of the collimator may be provided. Inner blade 300 may be comprised of two strips 302A and 302B that may move in relative movement between the strips so that inner blade 300 changes its width by relative motion of the two strips so as to change their effective combined width relative to the beams. This motion may be enabled by a motor, position measurement means and a controller, for example in a similar manner as discussed hereinbefore in reference of FIG. 8.

In the exemplary embodiments described above, the blades are arc shaped. However, designs based on flat blades may be used, in which case, the cutting edges may be curved so as to project the beam parallel to the detector rows as shown in FIG. 5. In these exemplary cases, edge curvature corresponding to middle of range or to one end of the range or to another value may be used.

Figure 11:
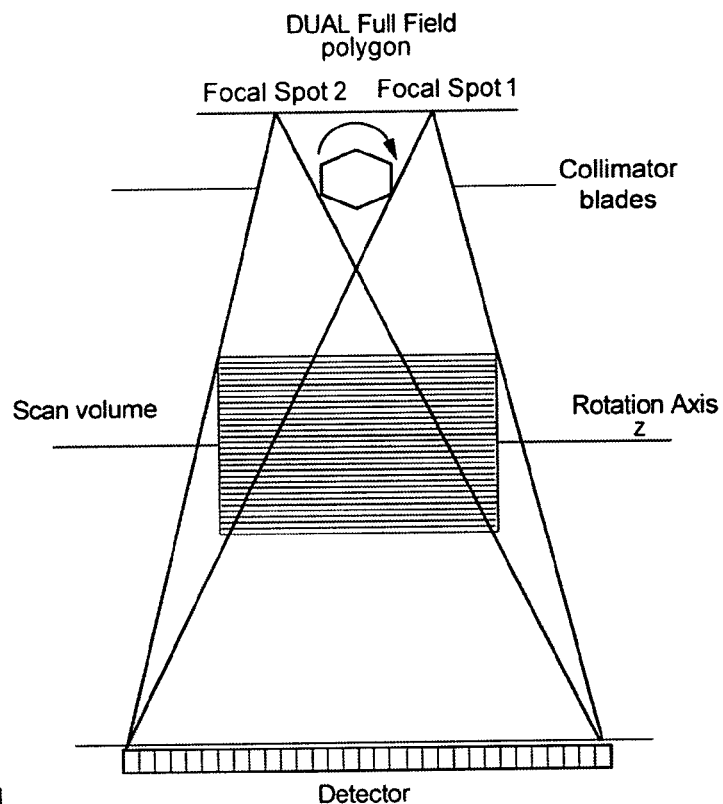
FIG. 11 is a prospective side view with a ray trace of an exemplary dual aperture, in accordance with some embodiments of the present invention, wherein the intermediate beam blocking element is a rotatable element having a non-circular cross-section profile.

According to yet another exemplary embodiment of the present invention shown in FIG. 11, a rotating, non-circular inner member of the collimator, having different widths at different rotational positions may be provided. According to some embodiments of the present invention, such an inner member may take the form of a non-circular cross sectioned (e.g. elliptical, rectangular) oblong body. Rotation of the non-circular inner member of the collimator about an axis may result in a change in the position of the cutting edges relative to the sources.

Various symmetrical non-circular shapes, as well as various asymmetrical shapes, when turning around their central axis, will result in a continuous and synchronized (i.e. equal on both sides at all times) change, through substantial parts of their rotational movement, in the horizontal shortest distance (X axis) of their cutting edges from an imaginary line passing through such an intermediate member's axis and which is perpendicular to the sources' common plane. On the other hand, the vertical (Y axis) positions of their cutting edges (i.e. shortest distances to the source's common plane) may differ through the majority of their movement, for example: as one edge is moving upwards (towards the sources' common plane) and the second edge is moving downwards (away from the sources' common plane). Since the beams coming from the sources may be of a pyramidal shape, different vertical positions of an intermediate member's cutting edges may result in differently sized apertures, although the cutting edges' horizontal distance from said perpendicular line is similar. In accordance with some embodiments of the present invention, the rotation of asymmetrical cross sectioned intermediate members of certain irregular shapes, and/or the position of their axes, may enable for the widths of a first aperture and a second aperture to nevertheless change continuously in synchronous as a function of the member's rotational angle.

In accordance with some other embodiments of the present invention, a rotating polygon like inner member of the collimator, having different widths at different rotational positions, may be provided. Positioning of the inner member of the collimator at specific discrete angles about an axis may result in a substantially similar change in the position of the cutting edges relative to the sources, such that the widths of a first aperture and a second aperture are likewise substantially similar.

Exemplary embodiments having two discrete collimator positions may be provided, for example by using a square, rectangular, rhombus and/or other polygon cross sections. Exemplary embodiments having three discrete collimator positions may be provided, for example by using a triangle and/or other polygon cross sections. Rotatable non-circular inner members of these designs may not have the ability to be arced. However, the cutting edges may be curved along the Z direction so as to project the beam parallel to the detectors' rows.

Figure 12:
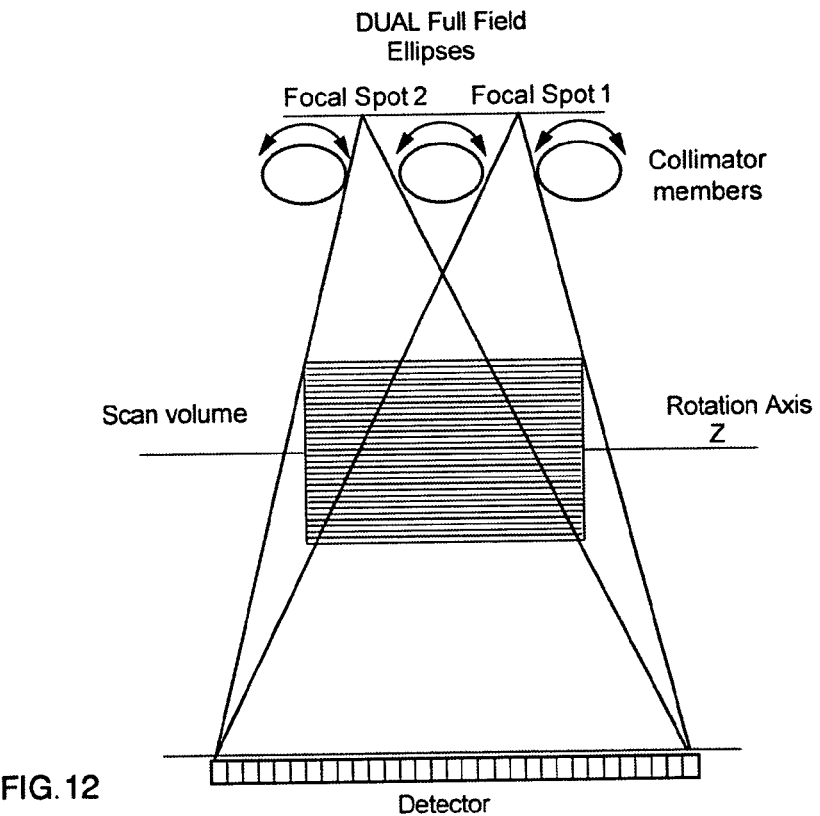
FIG. 12 is a prospective side view with a ray trace of an exemplary dual aperture collimator, in accordance with some embodiments of the present invention, wherein the first and second side beam blocking elements and the intermediate beam blocking element are rotatable elements having a non-circular (e.g. elliptic) cross-section profile.

According to yet another exemplary embodiment of the present invention shown in FIG. 12, all three members of the collimator may be rotatable. Cross section of the members may be for example elliptical, as shown, or polygon like, or circular like that is mounted eccentrically (e.g. the rotation axle is not positioned at the center of the circle), or of any other shape or cross section that may result in a change in the position of the cutting edge/edges relative to the sources. According to yet further exemplary embodiments of the present invention, rotation of non-circular cross-sectioned members, about their central axis, may still result in a change in the position of the cutting edge relative to the sources. As in the exemplary embodiment disclosed in FIG. 11, the cutting edges may be curved so as to project the beam parallel to the detectors rows.

Figure 13:
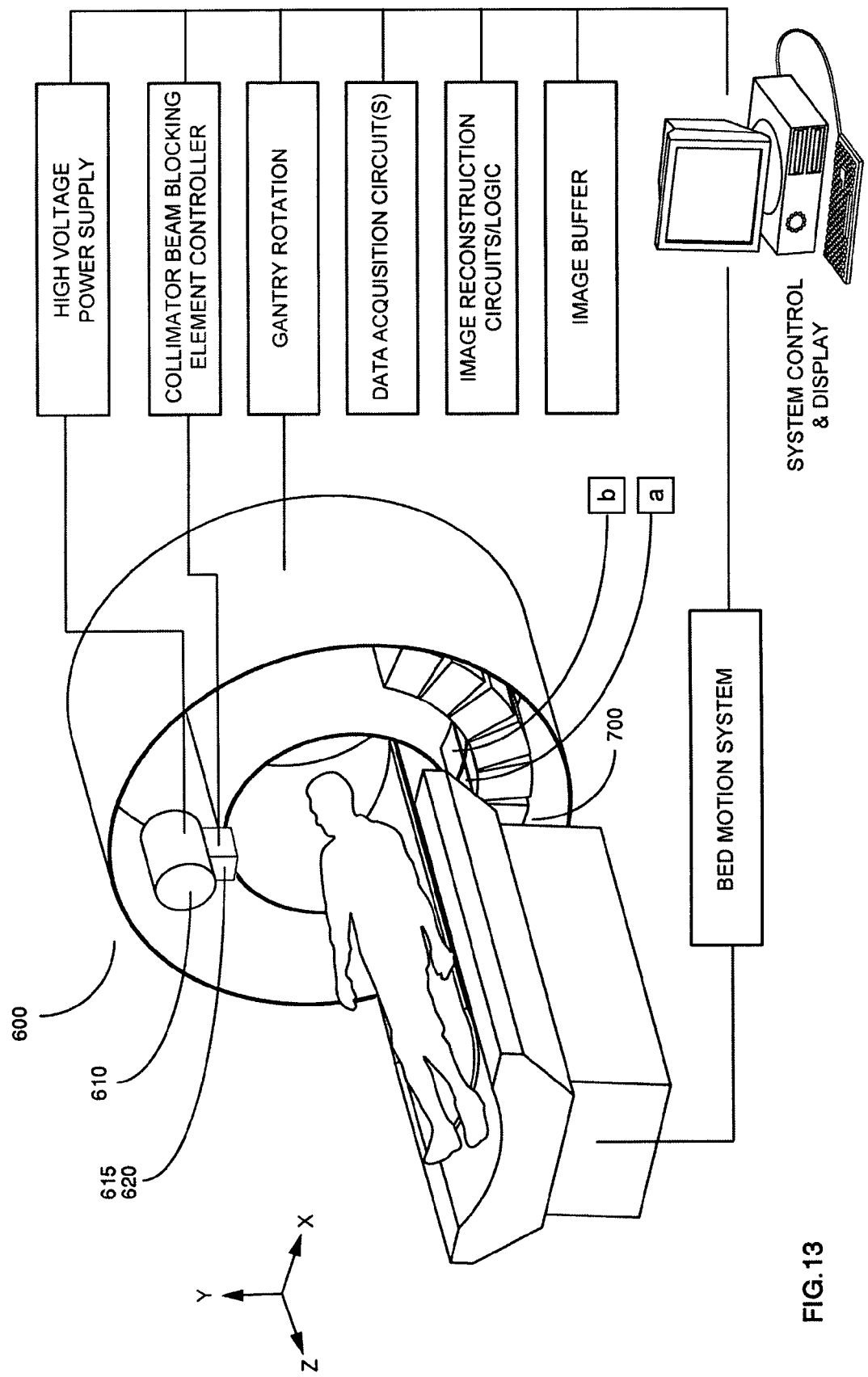
FIG. 13 is block diagram of an exemplary complete CT system, in accordance with some embodiments of the present invention.

According to some exemplary embodiments of the present invention, shown in FIG. 13, a complete CT system, may comprise (among various other components) a collimator 600 comprising: a radiation beams source(s) module 610 connected to a high voltage power supply source, and a beams blocking element(s) and motor(s) module 620 and 615 connected to a controller; and an arced detector 700, wherein a given detector column, of this specific non-limiting example, is comprised of two detector elements/cells 'a' and 'b'.

Figure 14A:
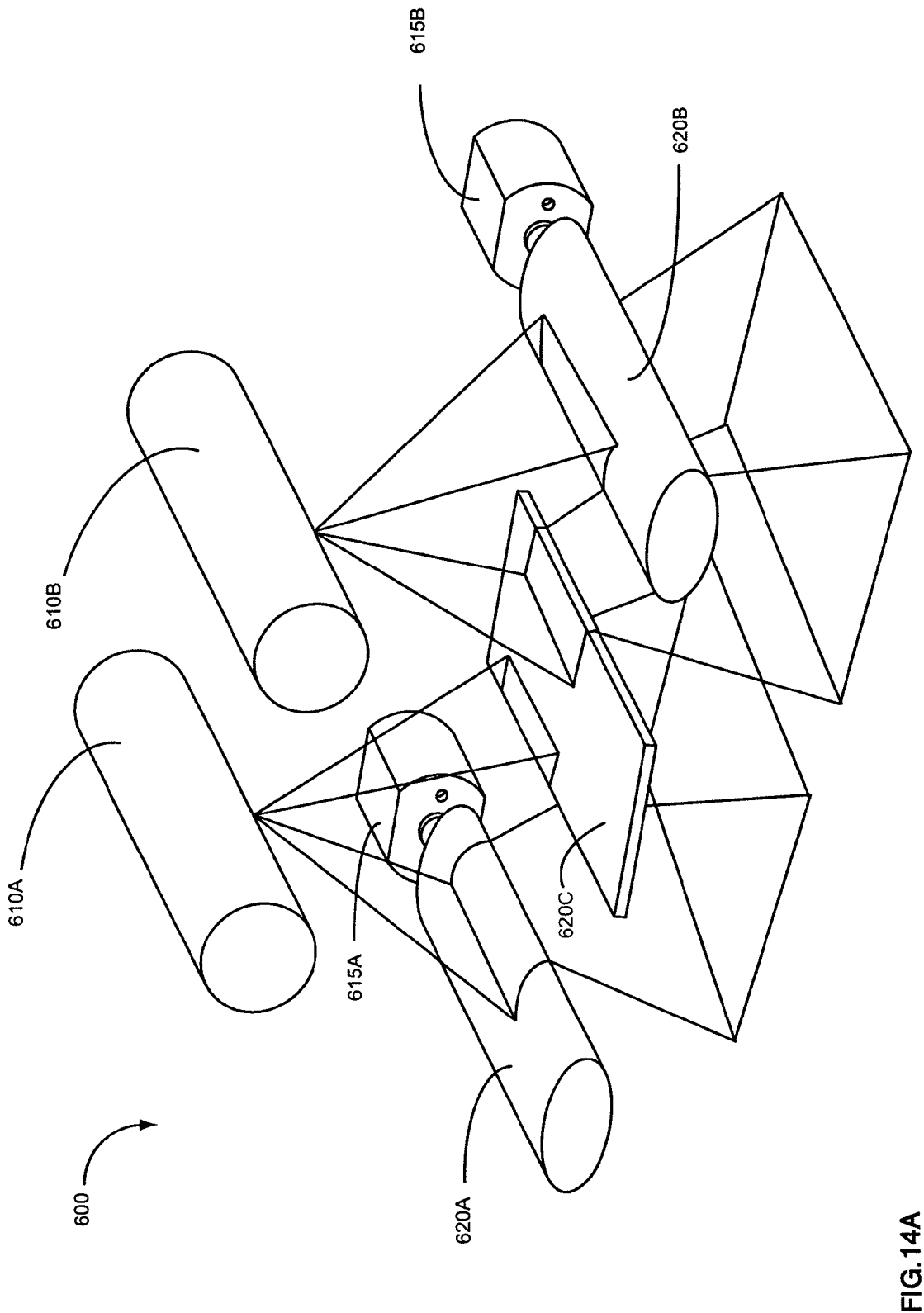
FIG. 14A is a prospective view of an exemplary dual aperture CT collimator, in accordance with some embodiments of the present invention, wherein the intermediate beam blocking element is a blade and the first and second side beam blocking elements are non-circular cross-sectioned elements attached to motors.

According to some exemplary embodiments of the present invention, shown in FIG. 14A, a dual aperture CT collimator may comprise a blade shaped intermediate beam blocking element 620C; and a first and second side beam blocking elements 620A and 620B, which side elements are non-circular cross-sectioned. Each such side beam blocking element may be respectively attached to a corresponding motor 615A and 615B. As shown, part of the pyramid shaped beams originating from radiation sources 610A and 610B, may be blocked by blocking elements 620A, 620B and 620C. Manipulation of the non-circular cross-sectioned blocking elements' (620A and/or 620B) rotational angle, by use of respective motors 615A and 6156, may change the size of the beams' blocked section. In this particular example, causing the elliptical cross-sectioned elements to turn 90 degrees, would cause the shorter elliptic diameter to become the vertically running diameter, thus decreasing the size of the beams' blocked section.

Figure 14B:
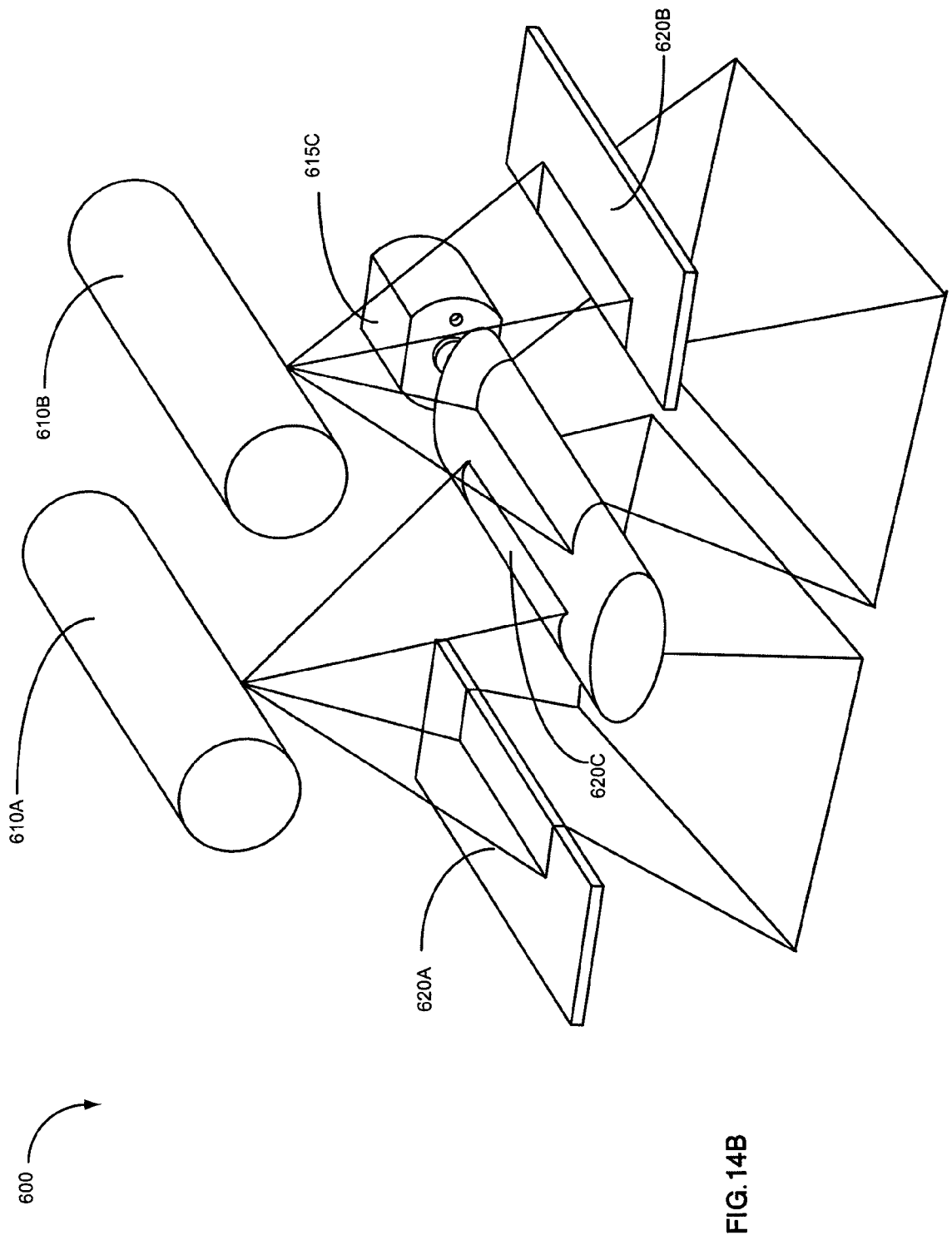
FIG. 14B is a prospective view of an exemplary dual aperture CT collimator, in accordance with some embodiments of the present invention, wherein the intermediate beam blocking element is a non-circular cross-sectioned element attached to a motor and the first and second side beam blocking elements are blades.

According to some exemplary embodiments of the present invention, shown in FIG. 14B, a dual aperture CT collimator may comprise an intermediate non-circular cross-sectioned blocking element 620C; and a first and second side beam blocking elements 620A and 620B, which side elements are blade shaped. The intermediate beam blocking element may be attached to a motor 615C. As shown, part of the pyramid shaped beams originating from radiation sources 610A and 610B, may be blocked by blocking elements 620A, 620B and 620C. Manipulation of the non-circular cross-sectioned blocking element's (620C) rotational angle, by use of its respective motor 615C, may change the size of the beams' blocked section. In this particular example, causing the elliptical cross-sectioned element to turn 90 degrees, would cause the shorter elliptic diameter to become the vertically running diameter, thus decreasing the size of the beams' blocked section.

Some of the exemplary embodiments of the present invention may have been described hereinbefore relative to a two-source CT scanner. However, substantially similar designs may be applied for larger numbers of sources by using additional inner members of the collimator, it will be understood by those skilled in the art that the present invention may also be practiced in accordance with these additional exemplary designs. In some exemplary embodiments of the present invention, the number of members or blades in the collimator may be determined by the number of radiation sources plus one. Additional modifications, substitutions, changes, and equivalents pertaining to the shape, positioning and/or other forms of adjustment of the members of the collimators will now occur to those skilled in the art, such embodiments fall within the true spirit of the invention.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An imaging radiation source assembly comprising:
   two radiation sources arranged along a common plane parallel to a plane of an associated radiation detector, each of said two radiation sources being substantially concurrently positioned to emit x-ray radiation in generally common or parallel trajectories to the other radiation source of said two radiation sources;
   a multi-aperture collimator arrangement located in a path of the emitted x-ray radiation of both of said two radiation sources and formed by first and second side x-ray beam blocking elements and by at least a first intermediate x-ray beam blocking element positioned between said first and second side x-ray beam blocking elements, such that an opening between said first side x-ray beam blocking element and a first edge of said at least first intermediate x-ray beam blocking element forms a first aperture, and an opening between a second edge of said at least first intermediate x-ray beam blocking element and said second side x-ray beam blocking element forms a second aperture, wherein one of said first and second apertures is located in a respective path of the emitted x-ray radiation of each of said two radiation sources and said collimator collimates the beams of radiation emitted from said two radiation sources to significantly overlap each other, thereby combining at least a portion of the beams from said two radiation sources into a combined irradiated volume; and
   at least a first actuator adapted to alter substantially in synchronous dimensions each of said first and second apertures by moving one or more of said x-ray beam blocking elements.

2. The assembly according to claim 1, wherein said first actuator is adapted to alter said apertures by moving one or more of said x-ray beam blocking elements towards or away from said two radiation sources.

3. The assembly according to claim 1, comprising more than one intermediate blocking element and wherein openings between said first and second side beam blocking elements and said more than one intermediate blocking elements form more than two apertures.

4. The assembly according to claim 1, wherein said at least first actuator is adapted to alter dimensions of each of said apertures along a direction parallel to the common plane.

5. The assembly according to claim 1, wherein said first actuator is functionally associated with said at least first intermediate beam blocking element and is adapted to move said at least first intermediate beam blocking element.

6. The assembly according to claim 1, wherein said at least first intermediate beam blocking element is a non-circular shaft/bar/rod having a different cross-sectional diameter along different rotational angles.

7. The assembly according to claim 1, wherein said first actuator is functionally associated with said side beam blocking elements and is adapted to move said associated beam blocking elements.

8. The assembly according to claim 1, wherein said first actuator is adapted to alter each of said first and second apertures by moving one or more of said x-ray beam blocking elements to discrete positions.

9. The assembly according to claim 1, wherein at least one of said beam blocking elements is composed of metal blades with either straight edges or curved edges.

10. The assembly according to claim 1, wherein at least one of the beam blocking elements is an eccentric circular element.

11. An imaging system comprising:
    a radiation detector;
    two or more x-ray radiation sources arranged along a common plane substantially parallel to a plane of said detector, each of said two or more radiation sources being substantially concurrently positioned to emit x-ray radiation in generally common or parallel trajectories to the other radiation sources of said two or more radiation sources;
    a multi-aperture collimator arrangement located in a path of the emitted x-ray radiation of all of said two or more radiation sources and formed by first and second side x-ray beam blocking elements and by at least a first intermediate x-ray beam blocking element positioned between said first and second side x-ray beam blocking elements, such that an opening between said first side x-ray beam blocking element and a first edge of said at least first intermediate x-ray beam blocking element forms a first aperture, and an opening between a second edge of said at least first intermediate x-ray beam blocking element and said second side x-ray beam blocking element forms a second aperture, wherein one of said first and second apertures is located in a respective path of the emitted x-ray radiation of each of said two or more radiation sources and said collimator collimates the beams of radiation emitted from said two radiation sources to significantly overlap each other, thereby combining at least a portion of the beams from said two radiation sources into a combined irradiated volume;
    at least a first actuator adapted to alter substantially in synchronous dimensions of each of said first and second apertures by moving one or more of said x-ray beam blocking elements.

12. The system according to claim 11, comprising two radiation sources and one intermediate blocking element.

13. The system according to claim 11, comprising more than one intermediate blocking element and wherein openings between said first and second side beam blocking elements and said more than one intermediate blocking elements form more than two apertures.

14. The system according to claim 13, comprising more than two radiation sources.

15. The system according to claim 11, wherein said at least first actuator is adapted to alter dimensions of each of said apertures along a direction parallel to the common plane.

16. The system according to claim 11, wherein said first actuator is functionally associated with said at least first intermediate beam blocking element and is adapted to move said at least first intermediate beam blocking element.

17. The system according to claim 11, wherein said first actuator is adapted to alter each of said first and second apertures by moving one or more of said x-ray beam blocking elements to discrete positions.

18. A method of multisource collimation using a single collimator assembly including first and second side x-ray beam blocking elements and at least a first intermediate x-ray beam blocking element positioned between said first and second side x-ray beam blocking elements, such that an opening between said first side x-ray beam blocking element and a first edge of said first intermediate x-ray beam blocking element forms a first aperture, and an opening between a second edge of said intermediate x-ray beam blocking element and said second side x-ray beam blocking element forms a second aperture, said method comprising:

positioning two or more radiation sources along a common plane parallel to a plane of an associated radiation detector, such that each of the two radiation sources emits x-ray radiation in generally common or parallel trajectories to the other radiation sources of the two or more radiation sources;

positioning the multi-aperture collimator arrangement in a path of the emitted x-ray radiation of all of the two or more radiation sources such that one of the first and second apertures is located in a respective path of the emitted x-ray radiation of each of the two radiation sources and said collimator collimates the beams of radiation emitted from said two radiation sources to significantly overlap each other, thereby combining at least a portion of the beams from said two radiation sources into a combined irradiated volume; and moving at least one x-ray beam blocking element to alter substantially in synchronous dimensions each of said first and second apertures.

* * * * *